United States Patent Office 3,457,796
Patented July 29, 1969

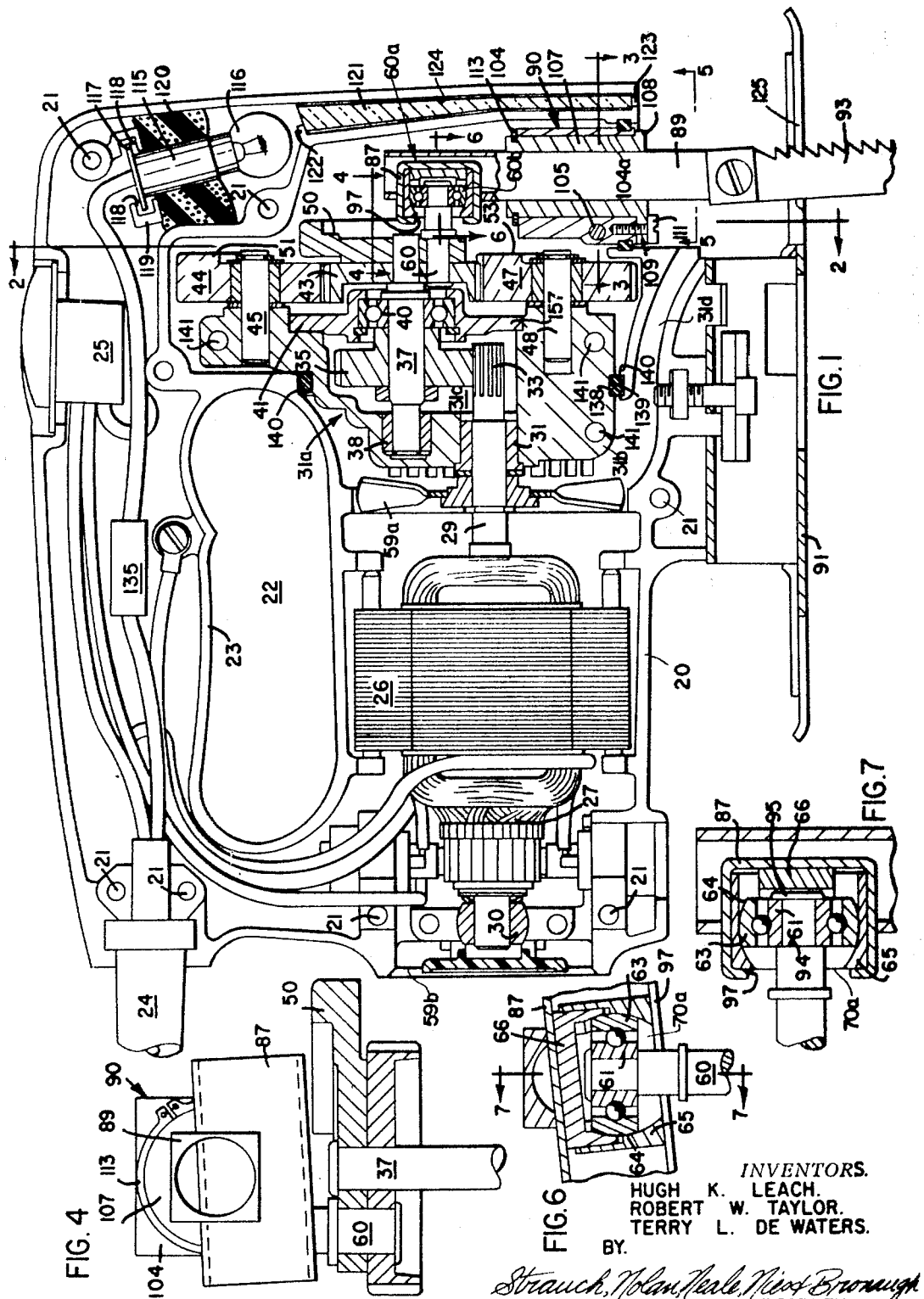

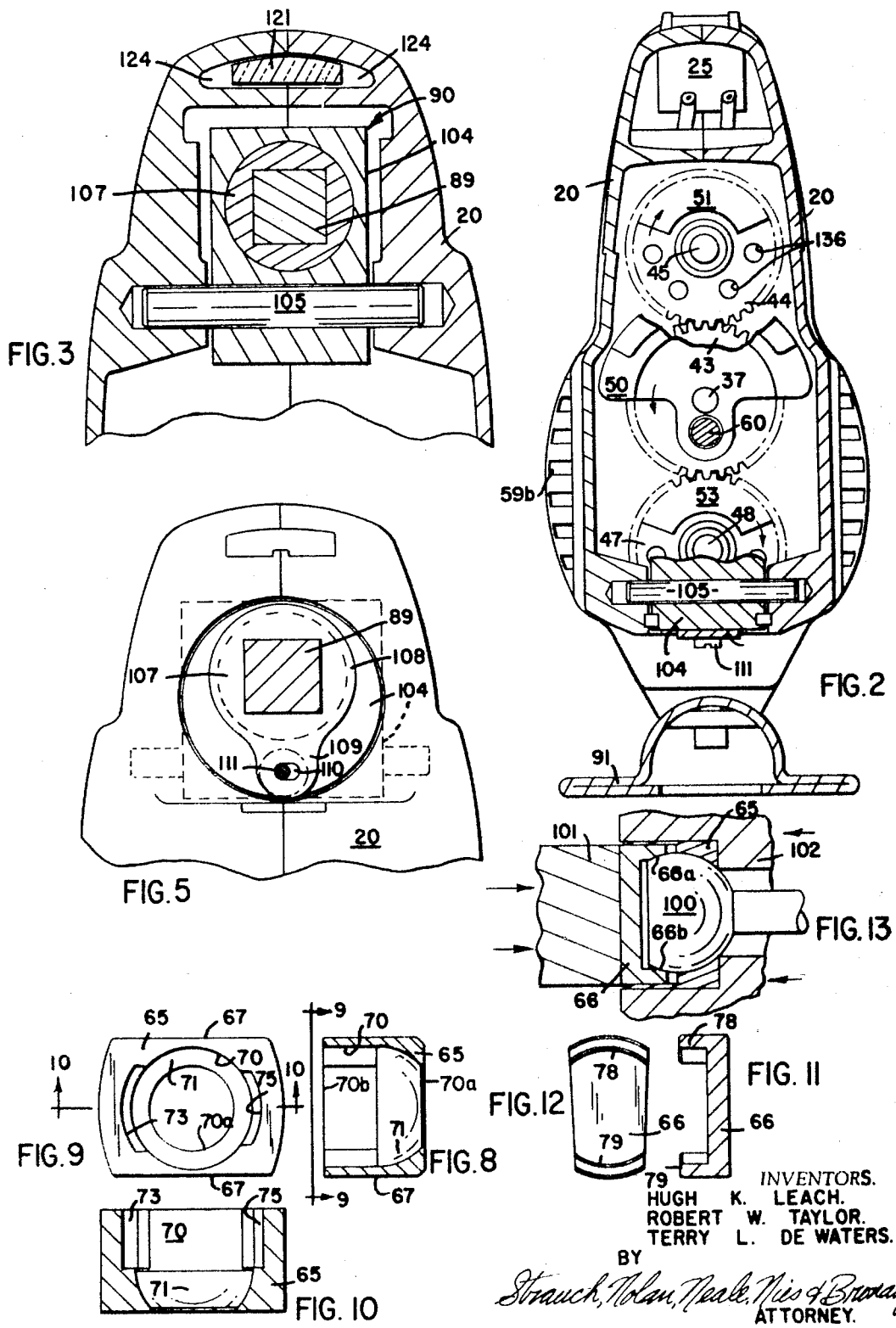

3,457,796
TOOL
Hugh K. Leach, Syracuse, Robert W. Taylor, Baldwinsville, and Terry L. De Waters, Syracuse, N.Y., assignors to Rockwell Manufacturing Company, Pittsburgh, Pa., a corporation of Pennsylvania
Continuation-in-part of application Ser. No. 498,215, Oct. 20, 1965. This application June 23, 1966, Ser. No. 559,941
Int. Cl. F16h 21/18
U.S. Cl. 74—50          14 Claims

ABSTRACT OF THE DISCLOSURE

A Saber saw or like saw having a reciprocating blade moved in a non-linear stroke by mechanism for converting rotary drive motion to reciprocating blade motion to impart an adjustable orbital motion to the blade. The motor compartment is separated from the compartment containing the drive gearing and at least one of the compartments is cooled by an air stream.

---

This application is a continuation-in-part of Serial No. 498,215 filed Oct. 20, 1965, for Power-Operated Tool.

The invention herein relates to a power-operated tool having a reciprocating cutter such as a saber saw or the like.

Orbital action saber saws generally known in the prior art produce an elliptical stroke which is determined and fixed by original design. Exceptions to the fixed orbit arrangements, wherein the extent of orbital action may be varied or totally eliminated to produce rectilinear cutting movement, are found in United States patent to Stelljes et al. No. 3, 095,748 of July 2, 1963 for Orbital Motion Tool and in United States patent to Papworth No. 2,775,272 of Dec. 25, 1956, for Portable Power Driven Reciprocable Cutting Tool.

The present invention constitutes an improvement on the aforesaid patents, by utilizing a unique variable orbit generating mechanism of simplified construction, reduced number of parts, sturdy construction and ready adjustability. While the above prior patents utilize distinct structures to provide the linear and orbital components of saw blade movement, the present invention utilizes a unitary, rotary to linear converting mechanism, which generates all requisite components of movement.

The invention has as another object a portable hand manipulated power-operated tool embodying a light source and a light transmitting arrangement for directing a beam of light on to the workpiece ahead of and in proximity to the cutter.

Further objects are to provide an improved portable power tool such as a saber saw in which the speed reduction gearing is arranged as a subassembly having a partition which when the subassembly is mounted in the tool casing divides the tool casing into two isolated chambers, one containing the heat producing electrical motor and the other containing the lubricant requiring gearing and blade carrier compartments and more particularly to provide such a tool in which the compartments forming partition is cooled by an air stream through the motor compartment induced incident to motor operation.

The above and other objects of the invention will become more fully apparent from the claims and from the description as it proceeds in connection with the drawings wherein:

FIGURE 1 is a lengthwise sectional view of a power-operated tool embodying our invention;
FIGURE 2 is a view taken on line 2—2, FIGURE 1;
FIGURE 3 is a view taken on line 3—3, FIGURE 1;
FIGURE 4 is a part sectional view taken substantially on line 4—4, FIGURE 1, with the crank pin moved to horizontal position, and the crank disk shown in section;
FIGURE 5 is a view indicated by line 5—5, FIGURE 1;
FIGURE 6 is a view taken on line 6—6, FIGURE 1;
FIGURE 7 is a view taken on a line corresponding to line 7—7, FIGURE 6;
FIGURE 8 is a vertical sectional view taken through the main section of the bearing follower;
FIGURE 9 is a view looking to the right, FIGURE 8;
FIGURE 10 is a view taken on line 10—10, FIGURE 9;
FIGURE 11 is a vertical sectional view through the inner or thrust portion of the bearing follower;
FIGURE 12 is a view looking to the right, FIGURE 11; and
FIGURE 13 is a sectional view of the parts forming the bearing follower shown in vertical section, the view including the forming tools for forming the follower sections.

The invention is shown and described in the form of a hand manipulated saber saw having a frame casing, or housing, 20, of the clam shell type, which consists of a pair of complemental mating sections or halves separable in a central parting plane extending longitudinally of the tool and secured together by fasteners extending through apertures 21. Each section of casing 20 is formed with complemental concavities in various areas to accommodate the operating structure of the tool. Each casing section is formed with an aperture, which when the sections are assembled provide an elongated finger receiving opening 22 under a handle or hand grip portion 23.

The mating concavities in the handle portion 23 define a chamber receiving the end of the power supply cord 24, motor operating switch 25 and lighting equipment including parts 115, 116, 121 and 135 described in detail presently.

A motor field 26 is fixedly mounted in the hollow interior of the casing 20 at one end. An armature 27 is mounted for rotation in the field 26, and its armature shaft 29 is journalled in bearings 30, mounted on the casing 20 and bearing 31, mounted within a subassembly gear box 31a accommodating the gear drive to the tool. The forward end of the armature shaft 29 is formed with a pinion 33 arranged in mesh with a spur gear 35 fixedly mounted on a shaft 37 within said subassemly gear box 31a. The gear box subassembly 31a comprises a casing member 31b and a cap 41 fixed together by screws (not shown) defining an enclosed gear chamber 31c about gears 33 and 35. The shaft 37 is journalled in a bearing 38 mounted on the casing member 31b and an antifriction bearing 40 mounted on cap 41.

The shaft 37 extends forwardly from the bearing 40 and of the gear box 31a to fixedly receive a gear 43. Gear 43 is in constant mesh with a gear 44 journalled on a stud 45 fixed to the gear box casing member 31b and a gear 47 journalled on the stud 48 carried by said gear box casing member 31b. There is affixed to the gear 43, a counterweight 50, see FIGURE 2. A counterweight 51 is affixed to the gear 44, and a counterweight 53 is affixed to the gear 47. The counterweights 50, 51, 53, are fixed to the respective gears in the order shown in FIGURE 2, and serve to dampen the vertical and lateral vibration resulting from the reciprocation of the tool carrier. Gears 44 and 47 have through bores 136 diametrically oposed by counterweights 51 and 53, to obtain desired weight distribution.

The gear box 31a referred to above comprises a unitary subassembly which as shown in section, in FIGURE 1, consists of a body 31b and cover member 41. Gears 35 and 33 are carried within chamber 31c of this box, while gears 43, 44, 47 forming a part of the crank drive are carried on shafts 37, 45, 48, protruding therefrom. The gear box 31a is fastened to one half of the housing (as a complete subassembly) by screws (not shown), passing through holes 141 and further retained in position by the clamping action of the mating half of the housing.

The inside of the gear box is packed with lubricant and suitable grease lubrication is provided about the drive train exterior of same (to tool carrier 89), but all lubricant is excluded from the motor chamber by elastomeric O-ring 138, accommodated in a shallow groove 139 of the gear box and tightly compressed by a shoulder-like formation 140 in the mating sections of housing 20. When the device is assembled and the two housing sections are lightly clamped together, O-ring 138 forms a transverse portion through the hollow interior of the casing 20 dividing it into a forward gear chamber and a rearward motor chamber. A fan 49a induces air flow into the motor chamber through air inlet ports 59b, which are arranged at the rear end of the motor casing member over the surface of gear casing member 31b and through exhaust channel 31d to discharge an air stream to the rear of the cuter blade 93.

The gear 43 serves as a crank and has a crank pin 60, on which is mounted a crosshead 60a by a universal bearing structure 60b. On the forward reduced end portion of the crank pin 60, there is affixed the inner race 61 of an antifriction bearing structure 60b. As is best shown in FIGURES 6 and 7, the outer race 63 of this bearing structure 60b is formed, on its periphery, with a spherical surface 64 which is embraced by the crosshead 60a here shown as of two-part construction consisting of sections 65 and 66.

Referring to FIGURES 8, 9 and 10, the section 65 is formed with planar outer surfaces 67 extending in parallel relation. The central portion of the section 65 is formed with a cylindrical bore 70 extending inwardly for approximately one-half the thickness of the piece. The bottom 71 of the bore 70 is of spherical formation complemental to the spherical surface 64 of the outer bearing race 63 (see FIGURES 6 and 7 also). There is an arcuate recess 70a at said one end portion of the member 65, and a larger arcuate end recess 70b having wedge extensions 73 and 75 in the opposite end portion of the member. The wedge shaped extensions form a recess of greater diametric length than the recess 70b.

The second section 66 of crosshead 60a is formed as shown in FIGURES 11 and 12. The section 66 is wedge shaped to mate with the recess formed by wedge extensions 73 and 75 and is formed at its ends with projections 78, 79, are dimensioned, both as to radius and respective length, complemental to the recesses 73, 75, whereby the section 66 can be inserted into and interfit with the section 65 with substantially no play.

As is shown in FIGURES 1, 6 and 7, the assembled crosshead, consisting of the sections 65 and 66, is slidably retained in a guideway formed in a crosshead guide 87 fixedly secured to the upper end of a cutter or blade carrier 89. The carrier 89 is slidably mounted in the rectilinear guideway of a guide bearing 90 for vertical reciprocation toward and from the base plate 91 attached to the casing 20. The guide bearing 90 is pivotally mounted by a bolt 105 on the casing 20 about an axis substantially parallel to a plane normal to the rotation axis of crank pin 60 and substantially perpendicular to the direction of reciprocation of blade carrier 89. The base plate 91 is formed with a slot through which the cutter, such as saw blade, 93 attached to the lower end of the carrier, extends.

Referring again to FIGURES 6 and 7, the inner race 61 of the antifriction crank pin bearing 60b is trapped between a radial shoulder 94, integral with pin 60 and a headed portion 95 of the crank pin 60. The outer race 63 of the antifriction bearing is trapped in the spheroidal socket of the crosshead 60a as will be described. The crosshead 60a has slidable interlocking engagement with a rectilinear guideway formed in the crosshead guide 87, which guideway extends in a direction perpendicular to the lengthwise axis of the tool carrier 89, and at slight acute angle to a plane normal to the axis about which the crank pin 60 rotates. Inasmuch as the bearing structure 60b and crosshead 60a are fixed against axial movement in the crank pin 60 and are movable in the guideway upon rotation of the crank shaft 37 along the guideway of crosshead guide 87, vertical reciprocation is imparted to the tool carrier along with simultaneous fore-and-aft pivotal movement of the crosshead guide 87 and tool carrier 89 about the axis of shaft 105.

In the arrangement shown, the crosshead guide 87 consists of a channel member, rectangular in cross section (see FIGURE 7), and formed with a slot 97 in its side confronting the crank disk 43 for reception of the crank pin 60. The crosshead assembly 60a rides within the channel member and is retained there within by overturned lips in line with slot 97.

As previously stated, the crosshead section 66 is also formed with an internal spherical surface crosshead embracing the outer race 63 of the crank pin bearing. Preferably, the thickness of the crosshead, consisting of the assembled sections 65, 66, should be such as to form a sliding fit in the guideway of crosshead guide 87, to avoid undue play between the crosshead and the follower axially of the crank pin 60 during the lateral fore-and-aft movement of the crosshead. These desired results are obtained as illustrated in FIGURE 13. A spherical hard forming member 100 is positioned in the section 65, and the section 66 then positioned in the section 65. The latter is then pressed against the spherical member 100, by a ram 101. During this operation, the section 65 is backed by a die 102 to prevent its movement. The ram 101 is moved towards the die 102 a distance to effect the proper overall thickness of the crosshead assembly, and, at the same time, the projections 78, 79, of the section 66 are coined to provide for the internal spherical surfaces 66a and 66b which, by means of the member 100 form an exact spherical continuation of the surface 71 on member 65. The result is that when the crosshead structure 60a, including the sections 65, 66, are assembled in the completed tool, there is no undue play between the crank pin bearing 60b and the crosshead 60a or between the crosshead 60a and the crosshead guide 87.

Referring again to FIGURE 1, to accommodate the fore-and-aft pivotal movement of the carrier 89 involved in orbital action thereof, the guide bearing 90 is mounted in the casing for oscillation about a shaft 105 extending perpendicularly to the bore of the bearing 90, and to the axis of rotation of the crank shaft 37. As shown in FIGURE 3, the carrier 89 and the guide bearing 90 have slidably interengaging rectangular surfaces to prevent relative rotation between these parts.

As pointed out above crosshead guide 87 is fixed to carrier 89 in a plane perpendicular to the longitudinal axis thereof and at a slight acute angle with respect to the plane of operation of crank 60 (see FIGURES 4 and 6). With the crank and follower assembly having only a sliding fit in crosshead 37 rotation of the crank will cause up and down movement of tool carrier 89 within bearing 90, and shall also cause rocking of said tool carrier and bearing 90 about shaft 105. The combined effect of the reciprocal and rocking movements of tool carrier 89 produce orbital aggressive cutting action at saw blade 93 by which the teeth of the blade 93 are moved into the end of the kerf during the upward or cutting stroke and away from the end of the kerf on the return or downward stroke.

In some instances to minimize chipping in materials such as plywood, it is preferred to have the saw blade reciprocate in a straight line rather than having the faster cutting aggressive or orbital motions. This is accomplished in the present invention by rotating the blade carrier 89 about its lengthwise axis to bring the guideway in the crosshead guide 87 inti parallel relation with the crank disk 43, that is, parallel to the plane in which the crank pin 60 rotates. Inasmuch as the blade carrier 89 is restrained from rotation in the guide bearing 90, this means that if the guide bearing 90 is rotated about the axis of the carrier 89, the blade carrier 89, crosshead guide 87 and guideway are rotated.

In the form disclosed, the guide bearing 90 is of two-piece construction consisting of an external rectangular block 104 which is the part mounted for oscillating movement on shaft 105 (see FIGURES 2, 3 and 5). The block 104 is formed with a cylindrical bore 104a to rotatably receive internally an externally cylindrical bushing 107 formed at its lower end with a radial flange 108 positioned against the lower end of the block 104. As is shown in FIGURE 5, block 104 is formed with a radially extending projection 109 flange 108 formed with an elongated slot 110 to receive a clamping screw 111 threading into the block 104. Referring again to FIGURE 1, the bushing 107 extends beyond the upper end of the block 104 and is provided with a circumferentially extending groove to receive a snap retainer ring 113, which serves in conjunction with the flange 108 to rotatably retain the bushing in axially fixed position in the block 104. The screw 111 is accessible through the slot in the base plate 91 and, when loosened, the bushing may be rotated in the block 104 to move the guideway in the crosshead 87 into and out of parallel relation to the plane in which the crank pin 60 rotates. It will be apparent that when the guideway in the crosshead 87 extends in parallel relation to the crank disk, straight line reciprocation is imparted to the tool carrier 89. This arrangement provides for the convenient adjustment of the parts exteriorly of the casing 20 to provide for straight line reciprocation of the tool carrier or any degree of orbital movement from zero to the design maximum, as desired.

It will be understood that the initial mounting of crosshead guide 87 on tool carrier 89 at an acute angle represent a preferred design only. The same effects, insofar as regulation or total elimination of orbital action is concerned could be effected by mounting crosshead guide 87 in parallelism with the sides of tool carrier 89. This would give an initial construction which would produce rectilinear motion, but which could be augmented for orbital action by changing the angularity of guide 90 and tool carrier 89.

Moreover, a still further equivalent arrangement could be attained by pivotal adjustable mounting of crosshead guide 87 on tool carrier 89 instead of fixed mounting of the preferred embodiment described above. The degree of orbital action imparted to the tool could then be attained by variable adjustment of crosshead guide 87 relative to tool carrier 89. Suitable access to the adjusting means from the interior of the casing would be provided.

The tool of our invention further includes a novel arrangement for directing a light beam on the workpiece in the area engaged by the cutter 93. As is shown in FIGURE 1, the casing sections 20 are formed with confronting concavities in an area remote from the cutter carrier and the area of the casing through which the carrier extends. There is an electric lamp receptacle 115 mounted in the concavities for the reception of a lamp 116. The receptacle 115 is provided at its base with a plate 117, opposite sides of which extend into confronting slots 118 formed in ribs 19 integral with the casing sections. The slots 118 are greater in width than the thickness of the plate 117 to provide for free movement of the lamp receptacle 115. The lamp receptacle is circumferentially embraced and supported by yieldable material 120, such as plastic foam.

The sections of casing 20 are also formed (as is best shown in FIGURES 1 and 3) with elongated confronting slots 124 forming a compartment which extends from the area in which the lamp 116 is positioned to the general area through which the cutter carrier 89 extends. A bar 121 of light-transmitting material such as lucite is positioned in this compartment, and is retained therein by shoulders 122-123 (FIGURE 1) formed at the ends of the compartment, these shoulders partially overlying the ends of the bar 121. The bar 121 is exposed at one end to lamp 116, is effective to transmit a light beam from the lamp 116 downwardly and to emit light from its other end toward and through the slots 125 in the base plate 91 to the guide line on the workpiece being sawed. That is, the light beam is directed on the workpiece immediately in front of the cutter 93.

The material 120 serves to absorb any vibration in the tool during the operation thereof, and to prevent such vibration being transmitted to the receptacle 115 and lamp 116. The lamp is connected in series with a voltage dropping resistor 135 across the power input leads during operation of the tool to the motors 26, 27.

The voltage rating of the motor being substantially higher than that of lamp 116, resistor 135 reduces the applied input voltage to the rated voltage of the lamp 116.

It will be apparent that this arrangement permits mounting the lamp in an area remote from the area of the casing through which the cutter carrier extends, and in fact remote from the actuating mechanism for the carrier, and yet effectively directs the beam on to the workpiece in the area of the cutter. This arangement is particularly advantageous in the saber saw type of tool described, in that it does not add any appreciable extension in the front of the casing. In tools of this type, it is desirable to maintain the spacing of the front of the casing from the cutter to a minimum, in order that the operator can more readily follow the guide line on the workpiece and get close to abutting upright surfaces. With this arrangement, the construction adds only a fraction of an inch to the fore and aft length of the tool, and yet provides for convenient mounting of the lamp.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed an desired to be secured by Letters Patent is:

1. In a portable saber saw capable of an agressive cutting action, a casing, a motor within said casing, a blade driving member mounted on said casing for rotation about a first axis and driven by said motor, a saw blade carrier, a saw blade carrier guide mounted on said casing for pivotal movement about a second axis substantially perpendicular to the said first axis, said carrier guide having a first guideway thereon guiding said blade carrier for longitudinal reciprocation in a direction substantially perpendicular to said first and second axes, and means on said driving member and said carrier interconnecting said driving member and said carrier in a manner to prevent relative movement of said carrier with respect to said driving member axially of said driving member whereby rotation of said driving member imparts simultaneous reciprocation of said carrier relative to said carrier guide and positive pivotal motion of said carrier guide and said carrier about said second axis.

2. The saw defined in claim 1 further comprising selectively variable means for selectively controlling the magnitude of pivotal motion of said carrier guide and carrier about said second axis in response to rotation of said driving member about said first axis whereby the degree of aggressive cutting action of said saw can be controlled.

3. The saw defined in claim 1 wherein said interconnecting means comprises a pin fixed to said driving member eccentric to its rotation axis, a crosshead universally pivotally mounted on said pin, a crosshead guide embracing said crosshead and fixed to said blade carrier, said crosshead guide having a second rectilinear guideway thereon embracing and defining the path of relative movement of said crosshead and said carrier, said second guideway being inclined to said plane whereby said crosshead guide is caused to move toward and from said driving member in response to rotation thereof and being substantially normal to said first guideway whereby rotation of said driving member imparts reciprocating motion of said blade carrier along said first guideway relative to said blade carrier guide.

4. The saw defined in claim 3 wherein said first guideway is mounted for rotation relative to said blade carrier guide about a third axis parallel to said first guideway and means for adjusting the angular orientation of said first guideway relative to said blade carrier guide about said third axis to thereby control the inclination of said second guideway relative to said plane and thereby control the magnitude of pivotal motion imparted to said blade carrier guide about said second axis in response to rotation of said driving member about said first axis.

5. The saw defined in claim 3 wherein said crosshead comprises a crosshead body in external sliding engagement with said second guideway and having internally a spheroidal socket and wherein the universal pivotal mounting of said crosshead upon said pin comprises an antifriction bearing having an inner race fixed axially to said pin and an outer race formed with an external spheroidal socket of said crosshead.

6. The saw defined in claim 5 wherein said crosshead body comprises a pair of interfitting body members each having interior segmental spherical surfaces thereon forming opposed halves of said spheroidal socket located on opposite sides of a diametral plane parallel to said second guideway and external planar surfaces parallel to and engaging said second guideway.

7. The saw defined in claim 6 wherein said second guideway constitutes the sole means retaining said crosshead body interfitting body members in assembly.

8. The saw defined in claim 6 wherein said pair of interfitting body members have complementary interfitting arcuate projections and recesses thereon concentric with the center of said spheroidal socket whereby relative rotation between said body members is precluded.

9. A power-operated tool having a reciprocating cutter comprising a casing, a crank journalled in the casing, said crank having a crank pin, a guide bearing mounted in the casing and having a bore extending therethrough substantially perpendicular to the axis of rotation of said crank, said bearing being mounted for oscillation about an axis extending transversely to said bore and the axis of rotation of said crank, a cutter carrier mounted for sliding movement in said bore, one end portion of said carrier extending outwardly from said guide bearing through said casing for attachment to a cutter, the opposite end portion of said carrier being disposed in juxtaposition to said crank, a crosshead guide fixedly secured to the opposite end portion of said carrier and being formed with a guideway extending in a direction transversely of the carrier, and at an acute angle to the plane in which said crank pin rotates, a crosshead having an internal bearing structure and having slidable interlocking engagement with said guideway, said crosshead being journalled on said crank pin and restrained against axial movement relative thereto by said bearing structure, means for restraining rotation of said blade carrier about its longitudinal axis whereby, upon rotation of said crank, reciprocation is imparted to said carrier and simultaneously movement in a direction toward and from said crank is imparted to the upper end of said carrier.

10. A power-operated tool having a reciprocating cutter comprising a casing, a crank journalled in the casing, said crank having a crank pin, a guide bearing mounted in the casing and having a bore extending therethrough perpendicular to the axis of rotation of said crank, said bearing being mounted for oscillation about an axis extending transversely to said bore and the axis of rotation of said crank, a cutter carrier mounted for sliding movement in said bore, one end portion of said carrier extending outwardly from said bearing through said casing for attachment to a cutter, the opposite end portion of said carrier being disposed in juxtaposition to said crank, a crosshead guide fixedly secured to the opposite end portion of said carrier and being formed with a guideway extending in a direction transversely of the carrier, and at an acute angle to the plane in which said crank pin rotates, a crosshead having slidable interlocking engagement with said guideway and being universally journalled on said crank pin and restrained against axial movement relative thereto, said carrier and guide bearing having engaging surfaces to restrain rotation of said carrier about its lengthwise axis relative to said bearing whereby, upon rotation of said crank, reciprocation is imparted to said carrier and simultaneously movement in a direction toward and from said crank is imparted to the upper end of said carrier.

11. A power-operated tool as defined in claim 10 and including means operable to effect rotation of said guide bearing to vary the angle of said guideway to the plane in which said crank pin rotates.

12. A portable power-operated saber saw comprising a casing, a motor mounted in said casing, a crank journalled in the casing and being operatively connected to said motor for rotation thereby, and said crank having a crank pin, a guide bearing mounted in the casing and having a bore extending therethrough perpendicular to the axis of rotation of said crank, said bearing mounted for oscillation about an axis extending transversely to said bore and the axis of rotation of said crank, a saw blade carrier mounted for sliding movement in said bore, the lower portion of said carrier extending downwardly from said bearing through said casing for attachment to a saw blade, the upper portion of said carrier being disposed in juxtaposition to said crank, a crosshead guide fixedly secured to the upper end portion of said carrier and being formed with a guideway extending in a direction transversely of the carrier, a crosshead structure having slidable interlocking engagement with said guideway and being universally journalled on said crank pin and restrained against axial movement relative thereto, said blade carrier and guide bearing having engaging surfaces to restrain rotation of said carrier about its axis relative to said bearing, and means operable exteriorly of said casing for effecting rotation of said guide bearing about the axis of the bore therein to move the guideway in said crosshead into and out of parallel relation with the plane of rotation of said crank pin.

13. A saber saw as defined in claim 12, said crosshead structure including an antifriction bearing having an inner race fixed to said pin against movement axially thereof, and an outer race having an outer surface of spherical form, a follower having slidable interlocking engagement with said guideway and having a spherically curved annular inner surface embracing the peripheral spherical surface of said outer race.

14. A power-operated tool as set forth in claim 10 wherein said guide bearing contains a bushing having an internal surface engaging said carrier, said bushing being rotatable about the longitudinal axis of said carrier, and means for locking said bushing in a selected rotated position.

References Cited

UNITED STATES PATENTS

| | | | |
|---|---|---|---|
| 2,771,786 | 11/1956 | Gilbert et al. | 74—606 |
| 2,975,007 | 3/1961 | Zwicker | 308—194 |
| 3,204,470 | 9/1965 | Brucker | 74—50 |
| 3,236,111 | 2/1966 | Naslund | 74—50 |
| 3,309,932 | 3/1967 | Davis | 74—44 |

FRED C. MATTERN, Jr., Primary Examiner

W. S. RATLIFF, Jr., Assistant Examiner

U.S. Cl. X.R.

143—68; 308—194

PO-1050
(5/69)

UNITED STATES PATENT OFFICE
CERTIFICATE OF CORRECTION

Patent No. 3,457,796         Dated July 29, 1969

Inventor(s) H. K. Leach, Robert W. Taylor, Terry L. DeWaters

It is certified that error appears in the above-identified patent and that said Letters Patent are hereby corrected as shown below:

```
Column 3, line 37, change "cuter" to --cutter--.
Column 3, line 65, after "79," insert --of arcuate formation.
          The peripheral surfaces of the projections
          78, 79,--.
Column 5, line 15, change "inti" to --into--.
Column 5, line 31, insert --of-- after "109".
Column 6, line 4, change "19" to --119--.
Column 7, line 41, after "spheroidal" insert --surface
          slidably embraced and retained by said
          spheroidal--.
Column 8, line 44, insert --being-- after "bearing".
Column 8, line 67, after "said" insert --crank--.
```

SIGNED AND
SEALED
APR 7 1970

(SEAL)
Attest:

Edward M. Fletcher, Jr.
Attesting Officer

WILLIAM E. SCHUYLER, JR.
Commissioner of Patents